United States Patent
Kutsubo et al.

(10) Patent No.: US 10,107,389 B2
(45) Date of Patent: Oct. 23, 2018

(54) HYDRAULIC CONTROL DEVICE FOR AUTOMATIC TRANSMISSION

(71) Applicant: AISIN AW CO., LTD., Anjo-shi, Aichi-ken (JP)

(72) Inventors: Hiroyuki Kutsubo, Nagoya (JP); Kazuki Kojima, Nukata (JP); Koji Makino, Okazaki (JP); Yoshimitsu Hyodo, Nishio (JP); Kenichi Tsuchida, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 224 days.

(21) Appl. No.: 15/109,008

(22) PCT Filed: Feb. 12, 2015

(86) PCT No.: PCT/JP2015/053809
§ 371 (c)(1),
(2) Date: Jun. 29, 2016

(87) PCT Pub. No.: WO2015/122452
PCT Pub. Date: Aug. 20, 2015

(65) Prior Publication Data
US 2016/0327155 A1      Nov. 10, 2016

(30) Foreign Application Priority Data

Feb. 12, 2014    (JP) .................................. 2014-024931

(51) Int. Cl.
*F16H 61/12*    (2010.01)
*F16H 61/00*    (2006.01)
*F16H 61/02*    (2006.01)

(52) U.S. Cl.
CPC .......... *F16H 61/12* (2013.01); *F16H 61/0021* (2013.01); *F16H 61/0206* (2013.01); *F16H 2061/1268* (2013.01)

(58) Field of Classification Search
CPC .. F16H 61/12; F16H 61/0206; F16H 61/0021; F16H 2061/1268
See application file for complete search history.

(56) References Cited

U.S. PATENT DOCUMENTS

| 5,078,028 A | 1/1992 | Ishikawa et al. |
| 2011/0278130 A1* | 11/2011 | Shimizu ................ F16D 48/02 192/85.63 |

(Continued)

FOREIGN PATENT DOCUMENTS

| JP | H01-238750 A | 9/1989 |
| JP | 2006-029391 A | 2/2006 |

(Continued)

OTHER PUBLICATIONS

May 19, 2015 Search Report issued in International Patent Application No. PCT/JP2015/053809.

*Primary Examiner* — David J Hlavka
(74) *Attorney, Agent, or Firm* — Oliff PLC (57) ABSTRACT

A hydraulic control device including: a throttle valve; a pressure regulating valve; an on/off solenoid valve of a normally open type that allows communication therethrough when not energized; and a failure circuit that, when power supply to the linear solenoid valve and the on/off solenoid valve is cut off, supplies a certain hydraulic pressure based on switching off of the on/off solenoid valve to the control oil chamber of the pressure regulating valve.

12 Claims, 8 Drawing Sheets

(56) References Cited

U.S. PATENT DOCUMENTS

| | | | |
|---|---|---|---|
| 2013/0319555 A1* | 12/2013 | Ishikawa | F16H 61/12 137/599.09 |
| 2014/0014208 A1* | 1/2014 | Ishikawa | F16H 61/12 137/628 |
| 2015/0018171 A1* | 1/2015 | Kawai | F16H 61/12 477/86 |

FOREIGN PATENT DOCUMENTS

| | | |
|---|---|---|
| JP | 2009-097696 A | 5/2009 |
| JP | 2013-213567 A | 10/2013 |
| WO | 2014/104145 A1 | 7/2014 |

\* cited by examiner

HYDRAULIC CONTROL DEVICE FOR AUTOMATIC TRANSMISSION

BACKGROUND

The present disclosure relates to a hydraulic control device for an automatic transmission mounted on an automobile, and specifically relates to a control device for line pressure that is hydraulic pressure for operating the respective friction engagement elements of an automatic transmission.

In the related art, a primary regulator valve regulates pump pressure from an oil pump to generate line pressure. In the primary regulator valve, basically, biasing force of a spring and throttle pressure from a throttle valve act against feedback pressure of the line pressure acting on a spool, whereby the line pressure is set based on a linear function defined by the minimum proof pressure and the maximum proof pressure (see Japanese Patent Application Publication No. 1-238750 and Japanese Patent Application Publication No. 2009-97696).

In general, the minimum pressure of the line pressure is set to be equal to or higher than a hydraulic pressure for obtaining a drive force (evacuation drive force) to ensure that the vehicle can at least travel minimally in case of a failure. Japanese Patent Application Publication No. 2009-97696 discloses a linear solenoid valve of a normally open type.

SUMMARY

In the primary regulator valve, when the throttle valve is a linear solenoid valve, if the linear solenoid valve fails while being fully closed and does not output the throttle pressure, there is a concern that the drive force may be insufficient. In view of this, the biasing force of the spring is set to be relatively strong so as to obtain the evacuation drive force. Thus, the minimum pressure of the line pressure represented by the linear function is set to be relatively high, so that the line pressure is also set to be relatively high throughout the entire range thereof, resulting in hydraulic pressure setting that is excessively high for hydraulic pressure required during normal traveling.

As the throttle valve structured with a linear solenoid valve, in ordinary cases, a normally open (N/O) type is generally used because there is a concern that the throttle valve may output no hydraulic pressure and the line pressure may decrease in the event of an all-off failure. Thus, when the throttle valve is not energized, the throttle pressure as output pressure is the highest and the line pressure is also high. As the control current increases, the line pressure decreases. Thus, in a range from low line pressure to middle line pressure that is more frequently used during normal traveling, a larger amount of control power supplied to the throttle valve is required, which increases power consumption.

In view of this, an exemplary aspect of the present disclosure provides a hydraulic control device for an automatic transmission that makes it possible to set the minimum pressure of the line pressure to be relatively low, that makes it possible to obtain drive force for a vehicle to travel, for example, in the event of an all-off failure in which power supply to a linear solenoid valve and an on/off solenoid valve is cut off, and that can reduce control power supplied to the throttle valve during normal traveling that is used for a significantly long period of time, thereby reducing power consumption.

The present disclosure according to an exemplary aspect provides a hydraulic control device for an automatic transmission including: a throttle valve that includes an input port to which source pressure is input, an output port, and a discharge port, and that outputs from the output port throttle pressure regulated in accordance with torque input to the automatic transmission, the throttle valve being a linear solenoid valve of a normally closed type that is fully closed when not energized; a pressure regulating valve that includes a control oil chamber that communicates with the output port of the throttle valve, a pressure regulating port that communicates with a line pressure oil passage from an oil pump, and a feedback pressure port to which feedback pressure from the line pressure oil passage is supplied, and that regulates hydraulic pressure of the pressure regulating port to a line pressure, with hydraulic pressure of the control oil chamber and biasing force of a spring acting on one end of a spool and with the feedback pressure from the feedback pressure port acting on the other end of the spool; an on/off solenoid valve of a normally open type that allows communication therethrough when not energized; and a failure circuit that, when power supply to the linear solenoid valve and the on/off solenoid valve is cut off, supplies a certain hydraulic pressure based on switching off of the on/off solenoid valve to the control oil chamber of the pressure regulating valve.

According to an exemplary aspect of the disclosure, the failure circuit includes a switching valve including a communication port that communicates with the control oil chamber of the pressure regulating valve and an input port to which the certain hydraulic pressure is supplied, the switching valve being switched by output pressure of the on/off solenoid valve, and when power supply to the linear solenoid valve and the on/off solenoid valve is cut off, the on/off solenoid valve switches the switching valve so that the input port communicates with the communication port, by which the certain hydraulic pressure is supplied to the control oil chamber of the pressure regulating valve through the input port and the communication port of the switching valve.

According to an exemplary aspect of the disclosure, the failure circuit includes a switching valve including a first port that communicates with the discharge port of the throttle valve, a drain port, an input port to which the certain hydraulic pressure is supplied, the switching valve being switched by output pressure of the on/off solenoid valve, and when power supply to the linear solenoid valve and the on/off solenoid valve is cut off, the on/off solenoid valve switches the switching valve so that the input port of the switching valve communicates with the first port thereof, by which the certain hydraulic pressure is supplied to the discharge port of the throttle valve through the input port and the first port of the switching valve and then supplied to the control oil chamber of the pressure regulating valve from the discharge port of the throttle valve through the output port of the throttle valve.

According to an exemplary aspect of the disclosure, the certain hydraulic pressure is output pressure of the on/off solenoid valve.

According to an exemplary aspect of the disclosure, the throttle valve uses modulator pressure as the source pressure, and the certain hydraulic pressure is the modulator pressure that is equal to the source pressure for the throttle valve.

According to an exemplary aspect of the disclosure, the failure circuit includes an oil passage that guides the certain hydraulic pressure to the control oil chamber of the pressure regulating valve through a check valve.

According to an exemplary aspect of the disclosure, the switching valve includes a first control oil chamber that is disposed on one end of a spool and a second control oil chamber that biases the spool in a direction toward the control oil chamber, and the output pressure of the on/off solenoid valve is supplied to the first control oil chamber, clutch control pressure or lockup control pressure is supplied to the second control oil chamber, and while hydraulic pressure is being supplied to both of the first and the second control oil chambers, the switching valve blocks communication between the input port and the first port and establishes communication between the first port and the drain port.

According to an exemplary aspect of the disclosure, in the event of all-off failure in which power supply to the linear solenoid valve and the on/off solenoid valve is cut off, the normally closed throttle valve becomes fully closed, but with the present disclosure, the normally open on/off solenoid valve allows communication therethrough. Thus, the certain hydraulic pressure is supplied from the failure circuit to the control oil chamber of the pressure regulating valve, whereby the line pressure can be maintained equal to or higher than a hydraulic pressure providing a drive force that enables the vehicle to travel. This makes it possible to set the minimum pressure of the line pressure to be a suitable value without considering the case of fully closing the throttle valve, and thus pressure loss (resistance generated in the oil pump, i.e., a load on the engine) can be reduced to improve the fuel efficiency.

The throttle valve structured with a linear solenoid valve needs less control current supplied to the throttle valve under normal conditions, particularly in a range from low to middle line pressures that are used for a longer period of time. Thus, even if the on/off solenoid valve is kept on-state, this solenoid valve for switching between on-state and off-state consumes less power than the throttle valve structured with a linear solenoid valve does, which can reduce power consumption of the entire hydraulic control device, thereby contributing to the fuel efficiency.

According to an exemplary aspect of the disclosure, the on/off solenoid valve switches the switching valve, whereby the certain hydraulic pressure is supplied to the control oil chamber of the pressure regulating valve.

According to an exemplary aspect of the disclosure, the certain hydraulic pressure from the switching valve is supplied from the discharge port of the throttle valve through the output port thereof to the control oil chamber of the pressure regulating valve. Thus, an oil passage for supplying throttle pressure to the pressure regulating valve can be used, which eliminates the need for a check valve, for example, thereby reducing the cost and also simplifying the oil passage structure.

According to an exemplary aspect of the disclosure, the output pressure of the on/off solenoid valve that operates, for example, in the event of all-off failure in which power supply to the linear solenoid valve and the on/off solenoid valve is cut off is used as the certain hydraulic pressure to be supplied to the pressure regulating valve. Thus, the certain hydraulic pressure can be supplied to the control oil chamber of the pressure regulating valve only when necessary, whereby a waste of oil is reduced.

According to an exemplary aspect of the disclosure, the certain hydraulic pressure that is supplied, for example, in the event of all-off failure in which power supply to the linear solenoid valve and the on/off solenoid valve is cut off is the modulator pressure that is equal to the source pressure for the throttle valve structured with a linear solenoid valve. Thus, the certain hydraulic pressure can be regulated to a line pressure that is the same as that when the throttle valve is fully open, which makes it possible to obtain a line pressure that ensures a drive force enabling the vehicle to travel under any circumstances. The source pressure that is the same as that under normal conditions is supplied to the input port of the throttle valve. Thus, the durability of the throttle valve can be less affected than when pressure higher than that under normal conditions is supplied to the input port (e.g., in a case that the line pressure is supplied when the throttle valve fails while being fully closed), for example.

According to an exemplary aspect of the disclosure, it is possible to prevent the throttle pressure guided from the output port of the throttle valve to the control oil chamber of the pressure regulating valve from flowing to another valve.

According to an exemplary aspect of the disclosure, the switching valve includes the second control oil chamber that is opposed to the first control oil chamber on which the output pressure from the on/off solenoid valve acts, and clutch-control hydraulic pressure or lockup-control hydraulic pressure acts on the second control oil chamber. Thus, the normally open on/off solenoid valve can be left not energized (make no output) with no control current being supplied even under normal conditions, whereby power consumption can be further reduced.

BRIEF DESCRIPTION OF THE DRAWINGS

FIG. 2 includes graphs illustrating characteristics of a primary regulator (pressure regulating) valve, in which

DETAILED DESCRIPTION OF EMBODIMENTS

Figure 1:
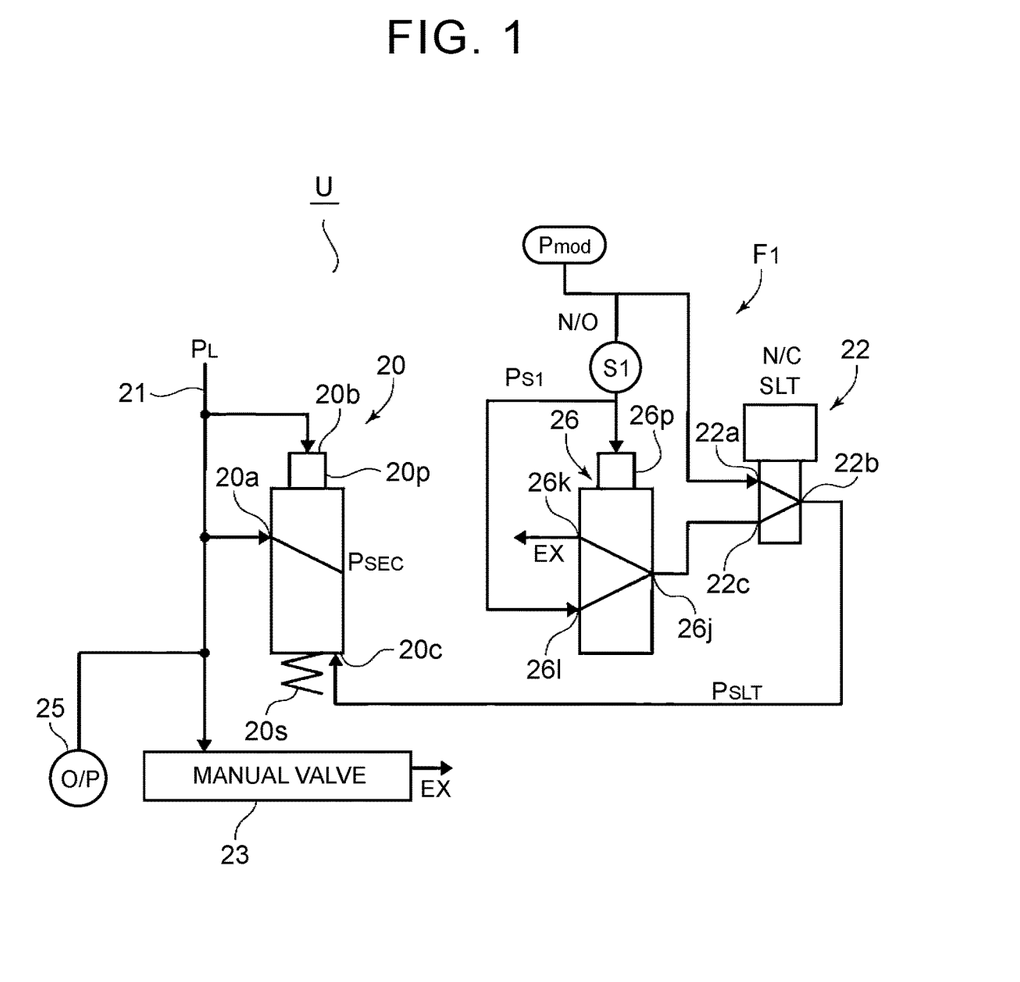
FIG. 1 is a schematic diagram illustrating a basic structure of a hydraulic control device (failure circuit) according to the present disclosure.

A basic structure of a hydraulic control device U for an automatic transmission having a failure circuit $F_1$ according to the present disclosure will be described first with reference to FIG. 1 and FIG. 2. In a primary regulator valve 20 included in a pressure regulating valve, as depicted in FIG. 1, hydraulic pressure from an oil pump 25 is supplied to a line-pressure regulating port 20$a$ to be regulated to a line pressure $P_L$, and the line pressure $P_L$ acts on a spool 20$p$ through a line pressure oil passage 21 as feedback pressure. With the feedback pressure acting on one end of the spool from a feedback pressure port 20$b$, and with biasing force of a spring 20s and throttle pressure $P_{SLT}$ from a throttle valve 22 acting on the other end of the spool from a control oil chamber 20c, hydraulic pressure at the pressure regulating port 20a is regulated to the line pressure $P_L$ while being drained. The drained hydraulic pressure is discharged as secondary pressure $P_{SEC}$. The line pressure $P_L$ is supplied to a hydraulic pressure servo for each friction engagement element through the line pressure oil passage 21 and a manual valve 23, for example.

The throttle valve 22 is structured with a linear solenoid valve (SLT), and this linear solenoid valve is of a normally closed (N/C) type that is fully closed when not energized. Thus, under normal conditions, in accordance with accelerator pedal operation by a driver, the throttle valve 22 controls the throttle pressure $P_{SLT}$ by controlling the ratio of communication of an output port 22b with an input port 22a to communication of a discharge port 22c therewith. Modulator pressure $P_{mod}$ from the input port 22a is output as the throttle pressure $P_{SLT}$ from the output port 22b, and part of the modulator pressure $P_{mod}$ is discharged from the discharge port 22c and then discharged from a drain port 26k through a first port 26j of a switching valve 26. When control current supplied to the throttle valve 22 is zero (not energized), the throttle pressure as an output is zero, and the throttle pressure increases as the control current increases. The throttle pressure $P_{SLT}$ from the output port 22b is supplied to the control oil chamber 20c of the primary regulator valve 20 to regulate and control the line pressure $P_L$.

Specifically, the throttle pressure $P_{SLT}$ is regulated in accordance with torque input to the automatic transmission. The torque input to the automatic transmission is calculated from engine output torque estimated from the operating state of an engine, an engine output torque signal received from an engine ECU, and the throttle opening.

The switching valve 26 is switched by turning ON and OFF the on/off solenoid valve (hereinafter, simply called "solenoid valve") S1. The solenoid valve S1, which is of a normally open (N/O) type that allows communication therethrough (output) when not energized, turns into a communicating state when not energized, and is switched into a blocked (non-output) state when energized. The solenoid valve S1 is in the non-output (zero pressure) state being energized (turned ON) under normal conditions, and the switching valve 26 is kept in a first state in which the first port 26j communicates with the drain port 26k. In the event of all-off failure in which power supply to the hydraulic control device U is cut off, the normally closed-type throttle valve 22 also turns off to become fully closed, simultaneously the normally open-type solenoid valve S1 also turns off to turn into the communicating (output) state, and the switching valve 26 is switched into a second state in which the first port 26j communicates with an input port 26l. Consequently, the modulator pressure $P_{mod}$ is supplied to the discharge port 22c of the throttle valve 22 through the solenoid valve S1, and the input port 26l and the first port 26j of the switching valve 26 that are in the communicating state. The output pressure $P_{S1}$ from the solenoid valve S1, i.e., a certain hydraulic pressure supplied to the input port 26l of the switching valve 26 is not limited to the modulator pressure $P_{mod}$, and only needs to be equal to or higher than a hydraulic pressure (minimum evacuation pressure) for obtaining a drive force to ensure that the vehicle can at least travel minimally.

In a state of the all-off failure, the normally closed throttle valve 22 turns into a fully closed state in which the throttle pressure cannot be output, i.e., the input port 22a and the output port 22b are fully closed, and the output port 22b communicates with the discharge port 22c. Thus, the modulator pressure $P_{mod}$ from the first port 26j of the switching valve 26 is supplied from the discharge port 22c to the output port 22b. The modulator pressure acts on the control oil chamber 20c at the lower end of the spool of the primary regulator valve 20.

Figure 2A:
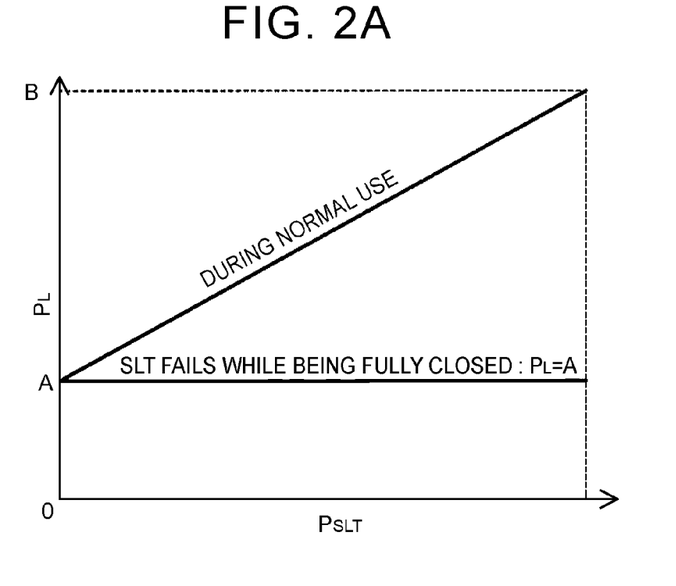
FIG. 2A is a graph for the related art.

Thus, in the related art, as depicted in FIG. 2A, in preparation for a case that the throttle valve (linear solenoid valve SLT) fails while being fully closed, the minimum proof pressure A of the line pressure $P_L$ is set to a hydraulic pressure A for obtaining the minimum evacuation drive force. The line pressure $P_L$ is set in proportion to the throttle pressure $P_{SLT}$ from the throttle valve with reference to the minimum proof pressure A until reaching the maximum proof pressure B. In the present disclosure, when the throttle valve (SLT) 22 becomes fully closed due to off failure, as described above, the modulator pressure from the discharge port 22c of the throttle valve 22 acts on the primary regulator valve 20, so that the line pressure is regulated to a line pressure ($P_L$=B) that is the same as that when the throttle valve 22 is fully open. This ensures that the vehicle can obtain drive force in any traveling conditions.

Figure 2B:
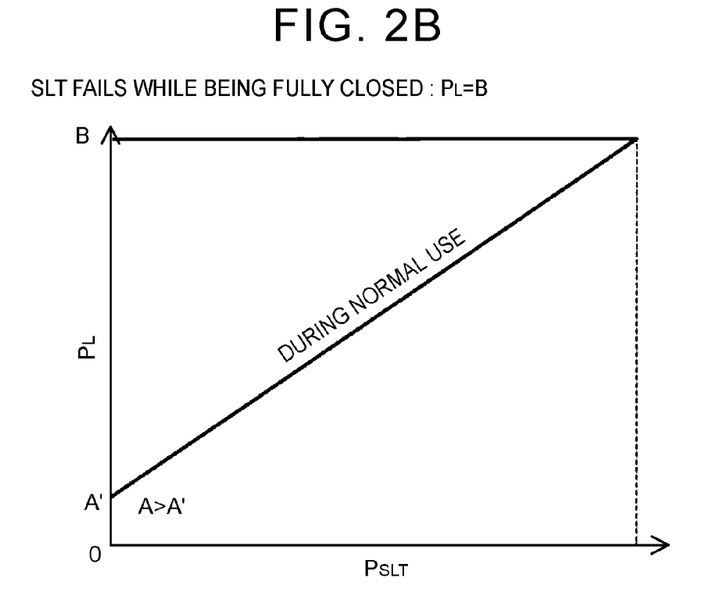
FIG. 2B is a graph for the present disclosure.

Consequently, as depicted in FIG. 2B, the primary regulator valve 20 according to the present disclosure is not restrained by the minimum evacuation drive force (A), and the biasing force of the spring 20s can be set to be small so that a minimum pressure A' by the spring can be set to be lower than the minimum proof pressure A in the primary regulator valve according to the related art (A>A'). Thus, the line pressure $P_L$ during normal use is defined by a linear function that connects between the minimum pressure N and the maximum pressure B, and the line pressure $P_L$ can be set to be lower than that in the related art. Under normal conditions, the line pressure is in a range from low pressure to middle pressure in most cases even during city driving in which stopping and low-speed driving are repeated or even during steady traveling in which the vehicle travels at a substantially constant speed. Accordingly, the throttle pressure is in a range from low pressure to middle pressure in most cases. The control current supplied to the normally closed-type throttle valve 22 consumes less power than a normally open-type throttle valve does also in the related art depicted in FIG. 2A. However, consumption of power supplied to the throttle valve 22 can be further reduced when the line pressure is set to be lower. Under normal conditions, even when the normally open solenoid valve S1 is energized (ON), the solenoid valve S1 consumes less power than the linear solenoid valve does.

Figure 3:
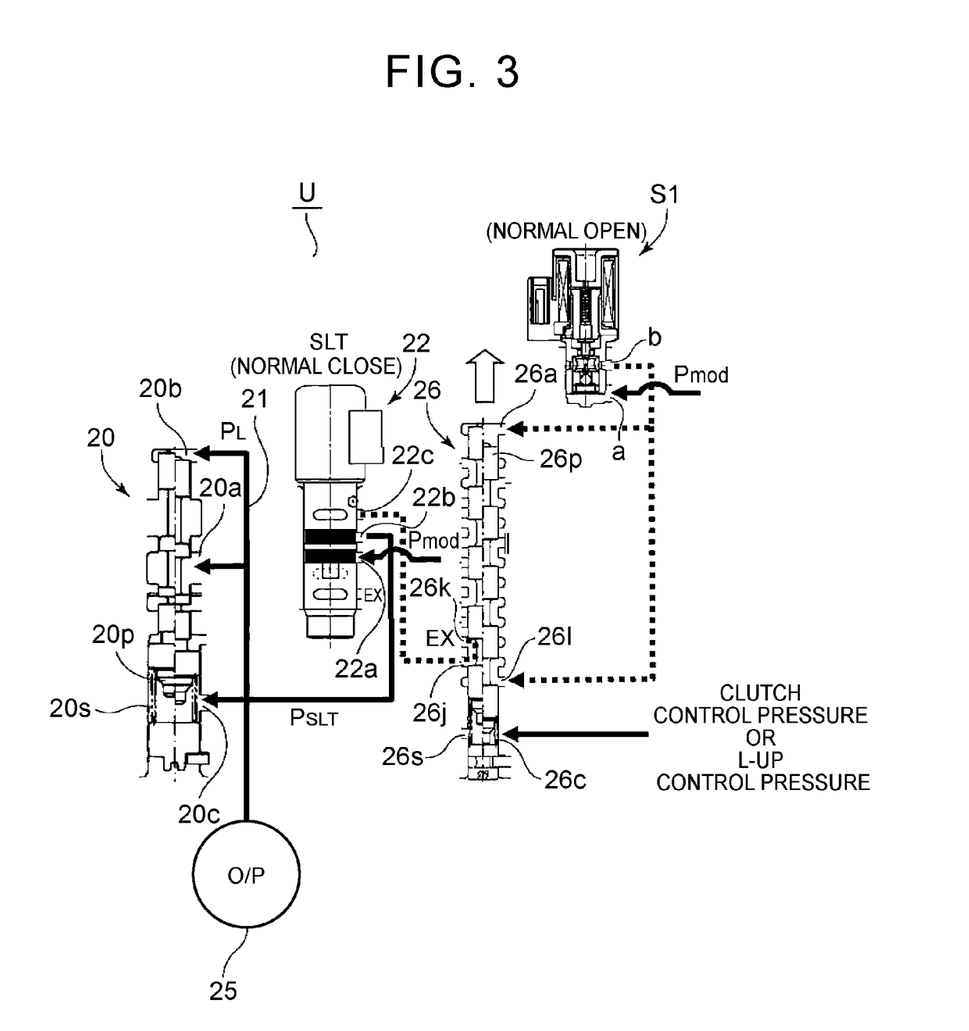
FIG. 3 is a diagram illustrating a hydraulic control device according to an embodiment of the present disclosure under normal conditions.
Figure 4:
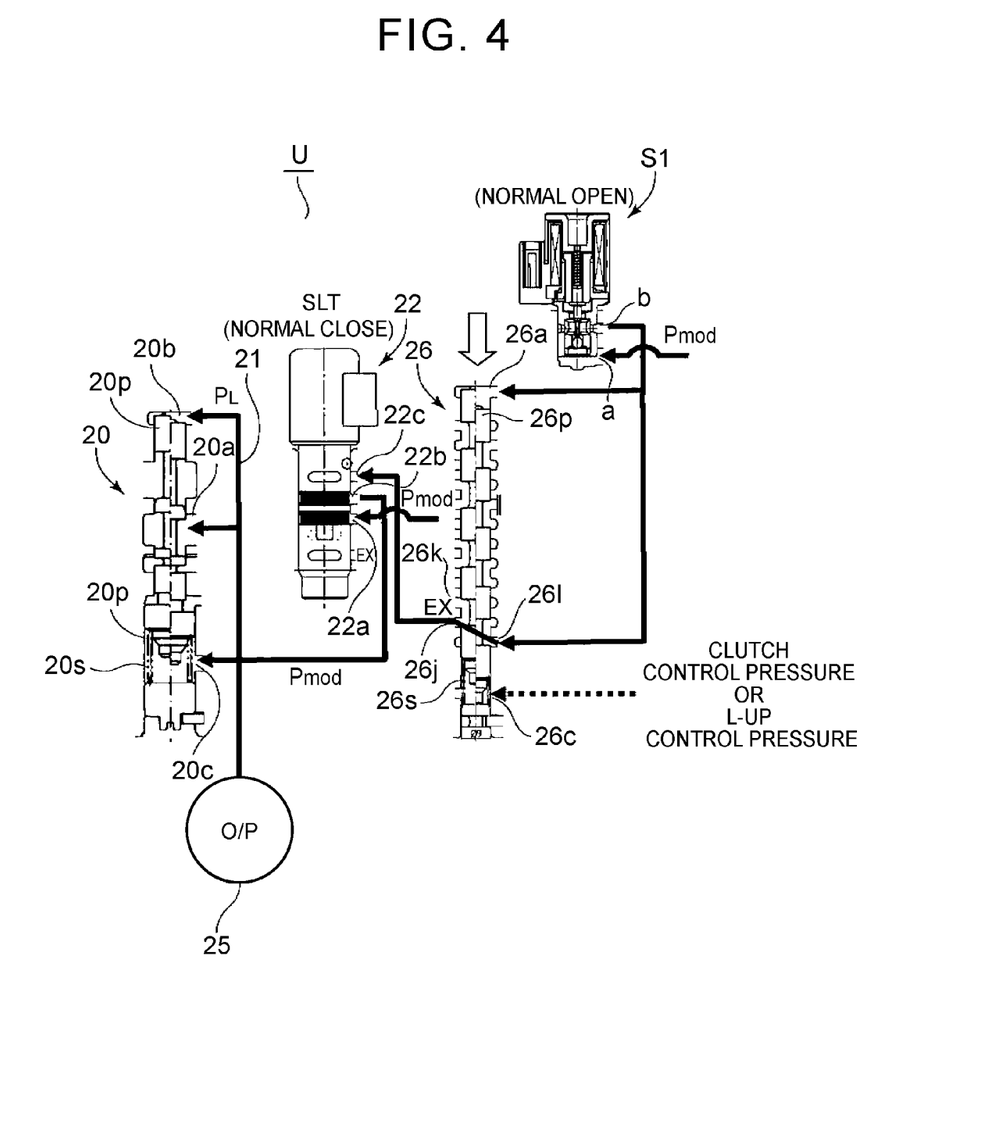
FIG. 4 is a diagram illustrating the hydraulic control device according to the embodiment of the present disclosure in the event of off failure.

The following describes embodiments in which the present disclosure is implemented, with reference to FIG. 3 and FIG. 4. The hydraulic control device U for the automatic transmission includes the throttle valve 22 structured with a linear solenoid valve (SLT) of the normally closed (N/C) type, the solenoid valve S1 of the normally open (N/O) type, the switching valve 26, and the primary regulator valve 20. The switching valve 26 is used, for example, in the event of all-off failure in which power supply to the hydraulic control device U is cut off, and is preferably used also as a control valve for supplying hydraulic pressure to predetermined clutches and brakes of the automatic transmission for evacuation drive.

FIG. 3 illustrates a normal state, and FIG. 4 illustrates an evacuation drive state in the event of all-off failure. In the normal state depicted in FIG. 3, the normally open solenoid valve S1 is energized, and is in the blocked (non-output) state, so that the modulator pressure $P_{mod}$ input to an input port a is not output from an output port b. Thus, hydraulic pressure is not supplied to a (upper) control oil chamber 26a disposed on one end (upper end) of a spool 26p, and the switching valve 26 is in a left-half position. Communication between the input port 26l and the first port 26j are blocked, and the first port 26j communicates with the drain port 26k.

The normally closed throttle valve 22, to which control current corresponding to required torque is supplied, regulates the modulator pressure $P_{mod}$ supplied to the input port 22a to a predetermined throttle pressure $P_{SLT}$ and outputs the throttle pressure $P_{SLT}$ from the output port 22b. At the same time, surplus pressure in the regulating is discharged through the discharge port 22c, and the first port 26j and the drain port 26k of the switching valve 26. The throttle pressure is supplied to the control oil chamber 20c of the primary regulator valve 20. With the throttle pressure $P_{SLT}$ and the biasing force of the spring 20s acting on one end of the spool 20p, and with the feedback pressure acting on the other end of the spool 20p from the feedback pressure port 20b, the primary regulator valve 20 regulates the hydraulic pressure from the oil pump 25 to the line pressure, and outputs the line pressure from the pressure regulating port 20a to the line pressure oil passage 21.

In this state, because the throttle valve 22 is normally closed, the throttle pressure is output in accordance with the control current, and thus power consumption can be reduced as described above. Because the solenoid valve S1 is normally open, the solenoid valve S1 is kept being energized (ON) in order to keep the non-output state. However, because the solenoid valve S1 consumes less power than the linear solenoid valve does, power consumption can be reduced in comparison with not only when the throttle valve 22 is normally open (N/O) but also when the throttle valve 22 is normally closed.

Figure 8:
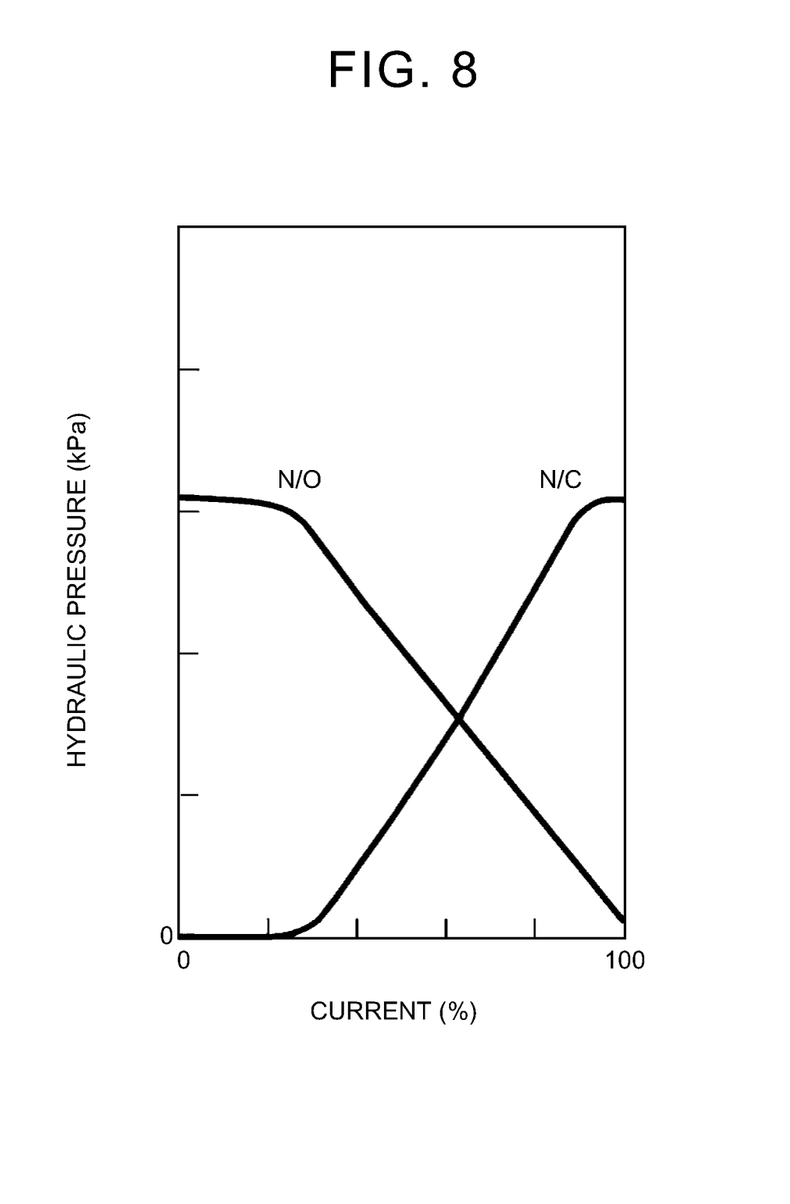
FIG. 8 is a graph illustrating relations between current and output hydraulic pressure of linear solenoids of a normally open type (N/O) and a normally closed type (N/C).

As depicted in FIG. 8, the normally open-type (N/O) linear solenoid valve outputs the maximum hydraulic pressure when not energized, and the output hydraulic pressure decreases as the current increases. By contrast, in the normally closed-type (N/C) linear solenoid valve, the output hydraulic pressure is zero when not energized, and the linear solenoid valve does not slide even when the current is applied until 20% of the maximum applied current is reached, and the output hydraulic pressure increases in proportion to increase in current when the current exceeds 20% of the maximum applied current. In steady traveling that is more frequently used during normal traveling, output hydraulic pressures in a range from low pressure to middle pressure, which is specifically equal to or lower than 30% of the maximum hydraulic pressure output, are used for a longer period of time. In view of this, using the normally closed-type (N/C) linear solenoid as the throttle valve 22 is much more effective in reducing power consumption than using a normally open-type (N/O) linear solenoid valve. As described above, it is possible to further reduce power consumption by using the normally closed-type linear solenoid valve as the throttle valve in synergy with capability of setting the line pressure during normal use to be relatively low without being restrained by the minimum evacuation drive force in the event of all-off failure, for example.

In the above description, the switching valve 26 is kept in the left-half position in which communication between the input port 26l and the first port 26j are blocked with the solenoid valve S1 being in the non-output state. However, as depicted in FIG. 3 and FIG. 4, the switching valve 26 is preferably structured such that clutch control pressure or lockup control pressure is supplied to the (lower) control oil chamber 26c disposed on the other end (lower end) of the spool 26p of the switching valve 26.

The clutch control pressure or the lockup control pressure is generated by a normally closed-type linear solenoid valve. Thus, under normal conditions, at least one of a plurality of clutch control pressures or lockup control pressures is in an output state, and the output control pressure is supplied to the lower control oil chamber 26c. In this state, even if the output pressure from the solenoid valve S1 is supplied to the upper control oil chamber 26a, the switching valve 26, on which the output control pressure acts together with the spring 26s, is kept in the left-half position. Thus, even if the normally open (N/O) solenoid valve S1 is in the output state when not energized (OFF), the switching valve 26 is kept in the left-half position, and thus power consumption can be further reduced by turning off the solenoid valve S1.

When all-off failure occurs in the hydraulic control device U of the automatic transmission, as depicted in FIG. 4, the solenoid valve S1 is turned off, and the normally open solenoid valve S1 turns into the communicating (output) state. The throttle valve 22 is also turned off, and the normally closed throttle valve 22 becomes fully closed, and the output port 22b communicates with the discharge port 22c.

In this state, the modulator pressure $P_{mod}$ output from the output port of the solenoid valve S1 is supplied to the upper control oil chamber 26a of the switching valve 26, and the switching valve 26 is switched into a right-half position in which the input port 26l communicates with the first port 26j, and communication between the first port 26j and the drain port 26k is blocked. Thus, the modulator pressure $P_{mod}$ output from the solenoid valve S1 is supplied to the discharge port 22c of the throttle valve 22 through the input port 26l and the first port 26j and then supplied to the control oil chamber 20c of the primary regulator valve 20 through the output port 22b being in the communicating state. Consequently, the primary regulator valve 20 outputs the maximum line pressure.

Even when the clutch control pressure or the lockup control pressure is supplied to the lower control oil chamber 26c of the switching valve 26, the clutch control pressure or the lockup control pressure generated by the normally closed-type linear solenoid valve becomes zero in the event of all-off failure, and thus the switching valve 26 is switched into the right-half position without being obstructed.

In the event of all-off failure, the line pressure can be supplied to the clutches and the brakes so that the vehicle can at least travel with minimal manipulation, such as shift lever operation, and the line pressure engages the predetermined clutches to enable the minimum evacuation drive.

Figure 5:
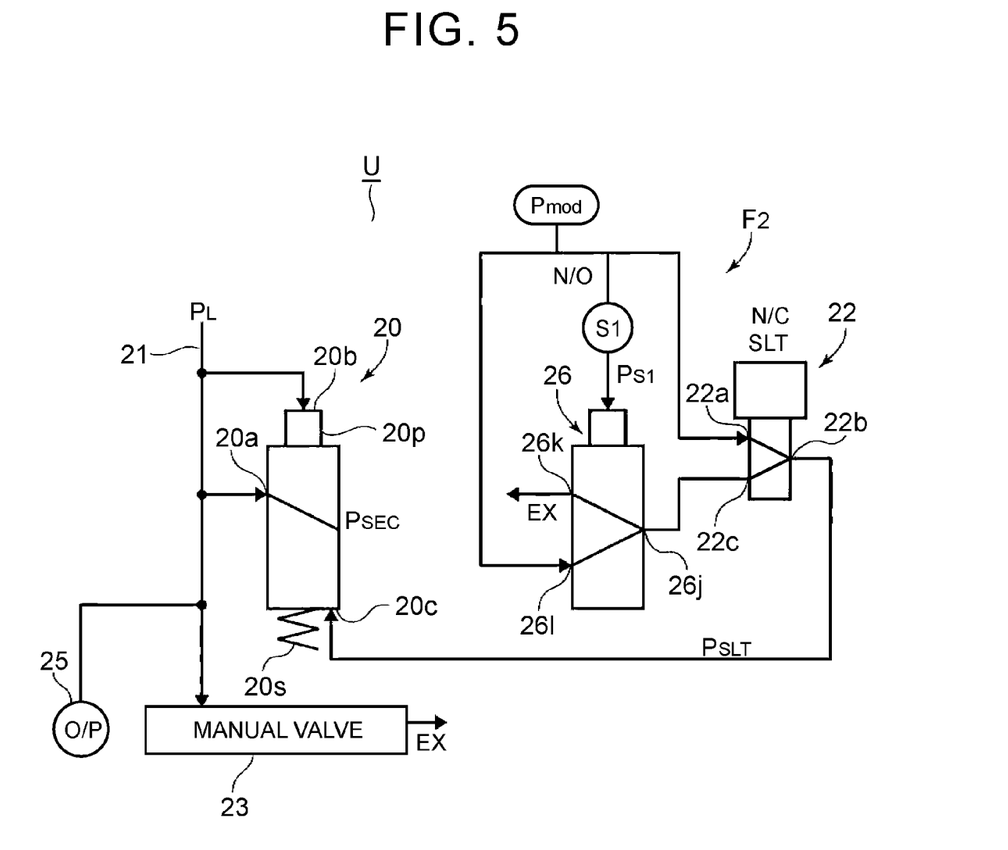
FIG. 5 is a diagram illustrating a failure circuit according to another embodiment.
Figure 6:
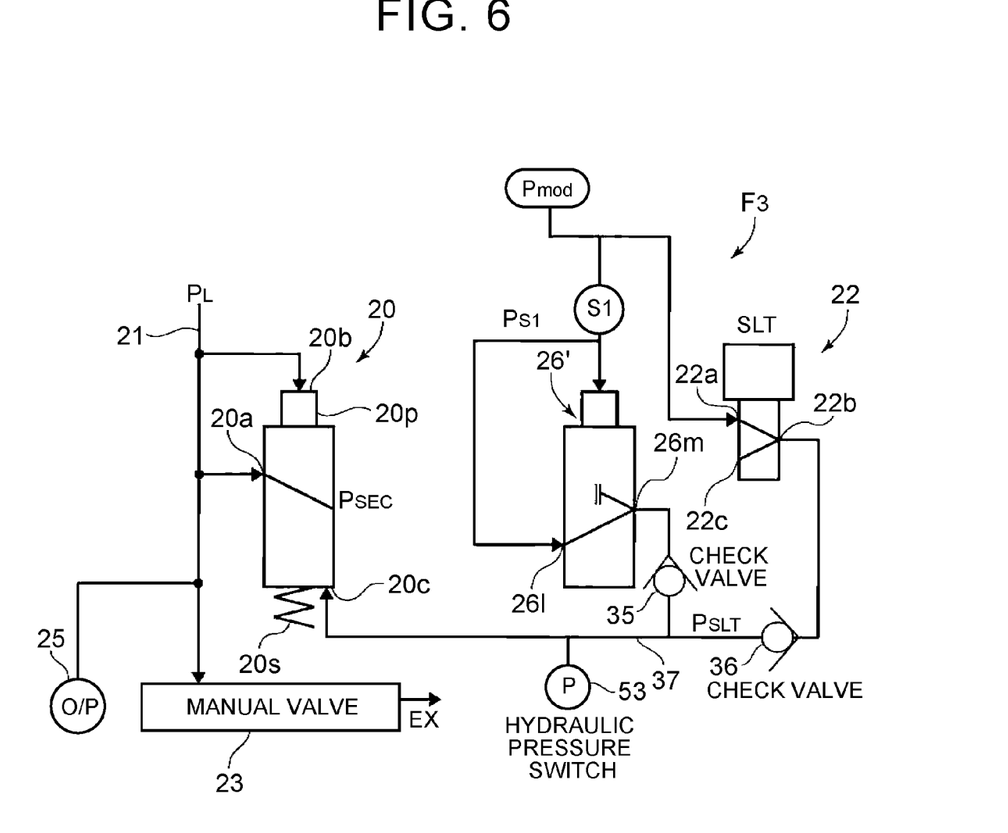
FIG. 6 is a diagram illustrating a failure circuit according to another embodiment.
Figure 7:
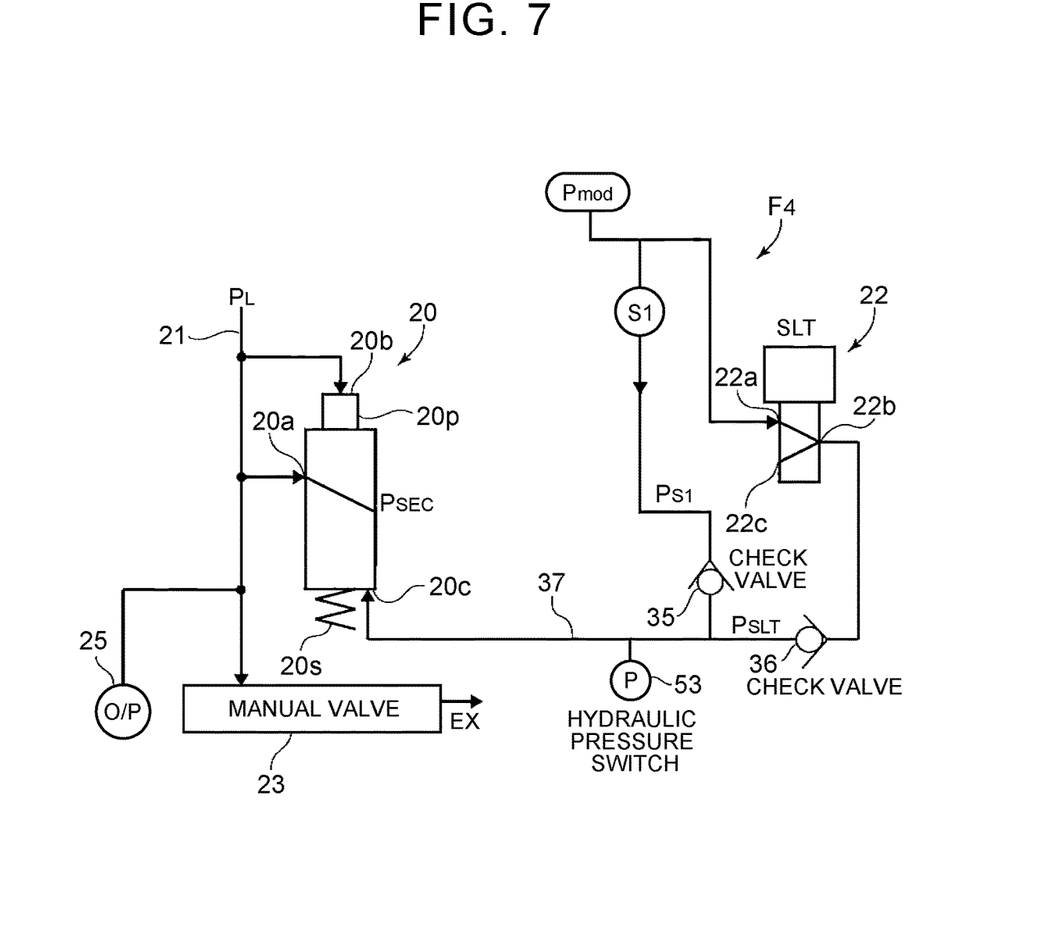
FIG. 7 is a diagram illustrating a failure circuit according to another embodiment.

The following describes a hydraulic control device having a failure circuit according to another partially modified embodiment with reference to FIG. 5 to FIG. 7. Herein, components that are similar to those in FIG. 1 are given the same reference numerals to omit description.

A failure circuit $F_2$ depicted in FIG. 5 directly supplies the modulator pressure $P_{mod}$ to the input port 26l of the switching valve 26. The solenoid valve S1 is normally open (N/O). Under normal conditions, the solenoid valve S1 is in the blocked (non-output) state and is energized, and communication between the input port 26l and the first port 26j of the switching valve 26 is blocked. Thus, the throttle valve 22 regulates the modulator pressure $P_{mod}$ supplied to the input port 22a to the throttle pressure $P_{SLT}$, outputs the throttle pressure $P_{SLT}$ from the output port 22b, and also discharges surplus pressure from the discharge port 22c to the drain port 26k through the first port 26j.

In the event of all-off failure, the normally open solenoid valve S1 becomes not energized (OFF) to output, and the switching valve 26 is switched so that the input port 26*l* communicates with the first port 26*j*. The normally closed throttle valve 22 becomes fully closed, and the modulator pressure is supplied to the discharge port 22*c* through the input port 26*l* and the first port 26*j* to be output from the output port 22*b* that is in the communicating state. This output pressure is then supplied to the control oil chamber 20*c* of the primary regulator valve 20.

In a failure circuit $F_3$ depicted in FIG. 6, a communication (first) port 26*m* of a switching valve 26' communicates with a throttle pressure oil passage 37 through a check valve 35. In the present embodiment, the output pressure $P_{S1}$ of the solenoid valve S1 is supplied to the input port 26*l*, but alternatively the modulator pressure $P_{mod}$ may be directly supplied as depicted in FIG. 5. A check valve 36 is provided upstream of a portion at which the throttle pressure oil passage 37 communicates with the communication port 26*m*.

In the present embodiment, under normal conditions of the throttle valve 22, the throttle pressure $P_{SLT}$ from the output port 22*b* is supplied to the control oil chamber 20*c* of the primary regulator valve 20 through the check valve 36. In this case, the check valve 35 does not allow the throttle pressure $P_{SLT}$ to flow into the communication port 26*m* of the switching valve 26'. The check valve 35 may be omitted if the switching valve 26' is configured to be closed in this state. In the event of all-off failure, the normally closed throttle valve 22 becomes fully closed, and the normally open solenoid valve S1 is switched into the communicating state, so that the input port 26*l* communicates with the communication port 26*m*. In this state, the certain hydraulic pressure (the output pressure $P_{S1}$ or the modulator pressure $P_{mod}$) is supplied to the control oil chamber 20*c* of the primary regulator valve 20 through the input port 26*l*, the communication port 26*m*, the check valve 35, and the oil passage 37. In this case, the certain hydraulic pressure of the oil passage 37 is prevented from flowing into the output port 22*b* of the throttle valve 22 by the check valve 36 and does not leak from the discharge port 22*c*.

In a failure circuit $F_4$ depicted in FIG. 7, the switching valve is not provided, and the output pressure $P_{S1}$ of the solenoid valve S1 is directly supplied to the throttle pressure oil passage 37 through the check valve 35. Thus, in the event of all-off failure, the normally closed throttle valve 22 becomes fully closed, and the normally open solenoid valve S1 is switched into the communicating (output) state. Consequently, the output pressure of the solenoid valve S1 is supplied to the control oil chamber 20*c* of the primary regulator valve 20 through the check valve 35 and the oil passage 37. Under normal conditions, the check valve 35 does not allow the throttle pressure $P_{SLT}$ from the throttle valve 22 to flow from the throttle pressure oil passage 37 back to the solenoid valve S1.

The embodiments have been described with respect to the event of all-off failure, which are applied to cases in which power supply to both of the solenoid valve structured with a linear solenoid valve and the on/off solenoid valve is cut off. The embodiments have been described while being applied to the primary regulator valve, but the embodiments may be applied to another pressure regulating valve in the same manner.

INDUSTRIAL APPLICABILITY

The present disclosure is industrially utilized for an automatic transmission mounted on an automobile.

The invention claimed is:

1. A hydraulic control device for an automatic transmission comprising:
    a throttle valve that includes an input port to which source pressure is input, an output port, and a discharge port, and the throttle valve outputs from the output port throttle pressure regulated in accordance with torque input to the automatic transmission, the throttle valve being a linear solenoid valve of a normally closed type that is fully closed when not energized;
    a pressure regulating valve that includes a control oil chamber that communicates with the output port of the throttle valve, a pressure regulating port that communicates with a line pressure oil passage from an oil pump, and a feedback pressure port to which feedback pressure from the line pressure oil passage is supplied, and that regulates hydraulic pressure of the pressure regulating port to a line pressure, with hydraulic pressure of the control oil chamber and biasing force of a spring acting on one end of a spool and with the feedback pressure from the feedback pressure port acting on an other end of the spool opposite the one end of the spool;
    an on/off solenoid valve of a normally open type that allows communication therethrough when not energized; and
    a failure circuit that, when power supply to the linear solenoid valve and the on/off solenoid valve is cut off, supplies a certain hydraulic pressure based on switching off of the on/off solenoid valve to the control oil chamber of the pressure regulating valve.

2. The hydraulic control device for the automatic transmission according to claim 1, wherein
    the failure circuit includes a switching valve including a communication port that communicates with the control oil chamber of the pressure regulating valve and the switching valve including an input port to which the certain hydraulic pressure is supplied, the switching valve being switched by output pressure of the on/off solenoid valve, and
    when power supply to the linear solenoid valve and the on/off solenoid valve is cut off, the on/off solenoid valve switches the switching valve so that the input port of the switching valve communicates with the communication port, by which the certain hydraulic pressure is supplied to the control oil chamber of the pressure regulating valve through the input port of the switching valve and the communication port of the switching valve.

3. The hydraulic control device for the automatic transmission according to claim 2, wherein the certain hydraulic pressure is output pressure of the on/off solenoid valve.

4. The hydraulic control device for the automatic transmission according to claim 2, wherein the throttle valve uses modulator pressure as the source pressure, and the certain hydraulic pressure is the modulator pressure that is equal to the source pressure for the throttle valve.

5. The hydraulic control device for the automatic transmission according to claim 2, wherein
    the failure circuit includes an oil passage that guides the certain hydraulic pressure to the control oil chamber of the pressure regulating valve through a check valve.

6. The hydraulic control device for the automatic transmission according to claim 1, wherein
    the failure circuit includes a switching valve including a first port that communicates with the discharge port of the throttle valve, a drain port, and an input port of the switching valve to which the certain hydraulic pressure is supplied, the switching valve being switched by output pressure of the on/off solenoid valve, and when power supply to the linear solenoid valve and the on/off solenoid valve is cut off, the on/off solenoid valve switches the switching valve so that the input port of the switching valve communicates with the first port thereof, by which the certain hydraulic pressure is supplied to the discharge port of the throttle valve through the input port of the switching valve and the first port of the switching valve and then supplied to the control oil chamber of the pressure regulating valve from the discharge port of the throttle valve through the output port of the throttle valve.

7. The hydraulic control device for the automatic transmission according to claim 6, wherein the certain hydraulic pressure is output pressure of the on/off solenoid valve.

8. The hydraulic control device for the automatic transmission according to claim 6, wherein the throttle valve uses modulator pressure as the source pressure, and the certain hydraulic pressure is the modulator pressure that is equal to the source pressure for the throttle valve.

9. The hydraulic control device for the automatic transmission according to claim 6, wherein the switching valve includes a first control oil chamber that is disposed on one end of a spool and a second control oil chamber that biases the spool in a direction toward the control oil chamber, and the output pressure of the on/off solenoid valve is supplied to the first control oil chamber, clutch control pressure or lockup control pressure is supplied to the second control oil chamber, and while hydraulic pressure is being supplied to both of the first and the second control oil chambers, the switching valve blocks communication between the input port of the switching valve and the first port and establishes communication between the first port and the drain port.

10. The hydraulic control device for the automatic transmission according to claim 1, wherein the certain hydraulic pressure is output pressure of the on/off solenoid valve.

11. The hydraulic control device for the automatic transmission according to claim 1, wherein the throttle valve uses modulator pressure as the source pressure, and the certain hydraulic pressure is the modulator pressure that is equal to the source pressure for the throttle valve.

12. The hydraulic control device for the automatic transmission according to claim 1, wherein the failure circuit includes an oil passage that guides the certain hydraulic pressure to the control oil chamber of the pressure regulating valve through a check valve.

\* \* \* \* \*